(12) United States Patent
Handiganoor et al.

(10) Patent No.: US 12,476,843 B2
(45) Date of Patent: Nov. 18, 2025

(54) ALTERNATE COMMUNICATION PATHS FOR VEHICLE SAFETY SIGNALS

(71) Applicant: FCA US LLC, Auburn Hills, MI (US)

(72) Inventors: Vinoot Handiganoor, Bangalore (IN); Anand Rajendran, Chennai (IN); Venkatesh Bommisetty, Andhra Pradesh (IN); Banuprakash Kuntanahalli, Bangalore (IN)

(73) Assignee: FCA US LLC, Auburn Hills, MI (US)

( * ) Notice: Subject to any disclaimer, the term of this patent is extended or adjusted under 35 U.S.C. 154(b) by 209 days.

(21) Appl. No.: 18/340,525

(22) Filed: Jun. 23, 2023

(65) Prior Publication Data
US 2024/0430130 A1  Dec. 26, 2024

(51) Int. Cl.
*H04L 41/5054* (2022.01)
*G06F 11/07* (2006.01)
*G06F 11/14* (2006.01)
*H04L 12/40* (2006.01)

(52) U.S. Cl.
CPC .... *H04L 12/40143* (2013.01); *G06F 11/0796* (2013.01); *G06F 11/1443* (2013.01); *H04L 2012/40273* (2013.01)

(58) Field of Classification Search
CPC ............... H04L 12/40143; H04L 2012/40273
See application file for complete search history.

(56) References Cited

U.S. PATENT DOCUMENTS

| | | |
|---|---|---|
| 7,499,774 B2 | 3/2009 | Barrett et al. |
| 8,112,189 B2 | 2/2012 | Peltz et al. |
| 2018/0295147 A1* | 10/2018 | Haga ................. H04L 67/12 |
| 2019/0141070 A1* | 5/2019 | Tsurumi ............. B60R 16/0232 |
| 2020/0007319 A1* | 1/2020 | Herzerg ............. H04L 9/0819 |
| 2021/0031792 A1* | 2/2021 | Hasegawa ............. B60R 16/02 |
| 2021/0328782 A1* | 10/2021 | David ............. H04W 12/0471 |
| 2021/0400024 A1* | 12/2021 | Kulkarni ............. G06F 16/22 |
| 2022/0141049 A1* | 5/2022 | Lee ................. H04L 12/40 701/1 |
| 2023/0342468 A1* | 10/2023 | Lee ................. H04L 63/1425 |
| 2024/0403406 A1* | 12/2024 | Handiganoor ........ G06F 21/572 |

FOREIGN PATENT DOCUMENTS

| | | |
|---|---|---|
| CN | 207931706 U | 10/2018 |
| CN | 110254512 A | 9/2019 |

\* cited by examiner

*Primary Examiner* — Abdelnabi O Musa
(74) *Attorney, Agent, or Firm* — Jeremy J. Klobucar

(57) ABSTRACT

Alternate path determination and communication techniques for a vehicle having a plurality of electronic control units (ECUs) on a controller area network (CAN) include providing a first non-CAN communication module associated with a first ECU of the plurality of ECUs, providing a second non-CAN communication module associated with a second ECU of the plurality of ECUs, the second ECU being configured to control a set of safety systems of the vehicle, maintaining a triggering logic database specifying a set of safety critical signals, triggering alternate communication from the first ECU to the second ECU of any of the set of signals matching the set of safety critical signals in response to a communication malfunction of the CAN therebetween, and controlling transmission of any safety critical signals from the first non-CAN communication module to the second non-CAN communication module.

18 Claims, 4 Drawing Sheets

ALTERNATE COMMUNICATION PATHS FOR VEHICLE SAFETY SIGNALS

FIELD

The present application generally relates to vehicle safety and communication systems and, more particularly, to techniques for providing alternate communication paths for safety signals in a vehicle having a plurality of electronic control units (ECUs) on a controller area network (CAN).

BACKGROUND

Today's vehicles often include a plurality of electronic control units (ECUs) that are each responsible for controlling a set of sub-systems. Safety critical components, such as airbag/restraint systems and brake systems, could be controlled by different ECUs. Safety critical signals must therefore be shared or communicated between the plurality of ECUs, such as via a controller area network (CAN). Conventional CAN communication protocols have error detection and recovery methods that may still potentially be susceptible to CAN communication path malfunctions/errors, which could potentially result in malfunctions of the relevant sub-systems (airbags not deploying, brakes not engaging, etc.). One potential solution is to provide hardwired connections between the various ECUs, but this increases costs and complexity. Accordingly, while such conventional vehicle control and communication systems do work for their intended purpose, there exists an opportunity for improvement in the relevant art.

SUMMARY

According to one example aspect of the invention, an alternate path determination and communication system for a vehicle having a plurality of electronic control units (ECUs) on a controller area network (CAN) is presented. In one exemplary implementation, the system comprises a first non-CAN communication module associated with a first ECU of the plurality of ECUs, the first ECU being a supervisory controller configured to monitor a set signals for the vehicle, a second non-CAN communication module associated with a second ECU of the plurality of ECUs, the second ECU being configured to control a set of safety systems of the vehicle, and a control system configured to maintain a triggering logic database specifying a set of safety critical signals and to trigger alternate communication from the first ECU to the second ECU of any of the set of signals matching the set of safety critical signals in response to a communication malfunction of the CAN therebetween, and control transmission of any safety critical signals from the first non-CAN communication module of the first ECU to the second non-CAN communication module of the second ECU, wherein receipt of one or more safety critical signals by the second non-CAN communication module of the second ECU causes the second ECU to control the set of safety systems accordingly.

In some implementations, the control system is configured to control transmission of the set of signals from the first ECU to the second ECU via the CAN when there is no communication malfunction of the CAN therebetween. In some implementations, the set of safety systems comprises at least one of a braking system of the vehicle and an airbag/restraint system of the vehicle. In some implementations, the non-CAN communication modules are in communication via a local interconnect network (LIN) bus. In some implementations, the set of signals and the set of safety critical signals both include an ignition status of the vehicle that is provided by an ignition module connected to both the CAN and the LIN bus.

In some implementations, the non-CAN communication modules are in communication via an Ethernet bus. In some implementations, the first and second ECUs are not configured to perform an error and recovery method for the CAN. In some implementations, the error detecting and recovery method includes at least one of checksums, Carrier Sense Multiple Access/Collision Detection (CSMA/CD), and firewall protection. In some implementations, the first and second ECUs are not connected via redundant hardwire communication lines.

According to another example aspect of the invention, an alternate path determination and communication method for a vehicle having a plurality of ECUs on a CAN is presented. In one exemplary implementation, the method comprises providing a first non-CAN communication module associated with a first ECU of the plurality of ECUs, the first ECU being a supervisory controller configured to monitor a set signals for the vehicle, providing a second non-CAN communication module associated with a second ECU of the plurality of ECUs, the second ECU being configured to control a set of safety systems of the vehicle, maintaining, by a control system, a triggering logic database specifying a set of safety critical signals, triggering, by the control system, alternate communication from the first ECU to the second ECU of any of the set of signals matching the set of safety critical signals in response to a communication malfunction of the CAN therebetween, and controlling, by the control system transmission of any safety critical signals from the first non-CAN communication module of the first ECU to the second non-CAN communication module of the second ECU, wherein receipt of one or more safety critical signals by the second non-CAN communication module of the second ECU causes the second ECU to control the set of safety systems accordingly.

In some implementations, the method further comprises controlling, by the control system, transmission of the set of signals from the first ECU to the second ECU via the CAN when there is no communication malfunction of the CAN therebetween. In some implementations, the set of safety systems comprises at least one of a braking system of the vehicle and an airbag/restraint system of the vehicle. In some implementations, the non-CAN communication modules are in communication via a LIN bus. In some implementations, the set of signals and the set of safety critical signals both include an ignition status of the vehicle that is provided by an ignition module connected to both the CAN and the LIN bus.

In some implementations, the non-CAN communication modules are in communication via an Ethernet bus. In some implementations, the first and second ECUs are not configured to perform an error and recovery method for the CAN. In some implementations, the error detecting and recovery method includes at least one of checksums, CSMA/CD, and firewall protection. In some implementations, the first and second ECUs are not connected via redundant hardwire communication lines.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, today's vehicles often include a plurality of electronic control units (ECUs) that are each responsible for controlling a set of sub-systems. In addition to controlling sub-systems, some ECUs may be supervisory-type ECUs that oversee a plurality of other ECUs. Safety critical components, such as airbag/restraint systems and brake systems, could be controlled by different ECUs. Safety critical signals must therefore be shared or communicated between the plurality of ECUs, such as via a controller area network (CAN). Conventional CAN communication protocols have error detection and recovery methods (checksums, Carrier Sense Multiple Access/Collision Detection (CSMA/CD), firewall protection, etc.) that may still be susceptible to CAN communication path malfunctions/errors, which could cause in malfunctions of the relevant sub-systems (airbags not deploying, brakes not engaging, etc.). Another potential solution is to provide hardwired connections between the various ECUs, but this increases costs and complexity (e.g., due to harness and signal quantity limitations). Thus, there exists an opportunity for improvement in the relevant art.

As a result, the present application is directed to techniques for determining and controlling alternate communication paths for safety critical signals for a vehicle having a plurality of ECUs on a CAN. In other words, these techniques discover and utilize alternate communication paths/routes for communication between ECUs so that other ECU-based algorithms are able to make crucial judgments in the event that physical communication path malfunctions/errors. This is achieved via a trigger mechanism or routine that selectively causes safety critical signals to be transmitted via an alternate (i.e., non-CAN) path (a local interconnect network (LIN) bus, Ethernet, etc.) in the presence of CAN malfunctions/errors to thereby ensure their safe and proper transmission. For AUTOSAR networks, this could include using the application or software component (SWC) layer for triggering and the service or communication module (COM)—between the protocol data unit (PDU) router (PDUR) and run-time environment (RTE) layer—for alternate communication, but it will be appreciated that legacy/non-AUTOSAR networks could be similarly adapted. The primary benefits of these techniques include improved robustness and decreased costs/complexity and potentially improved safety performance.

Figure 1:
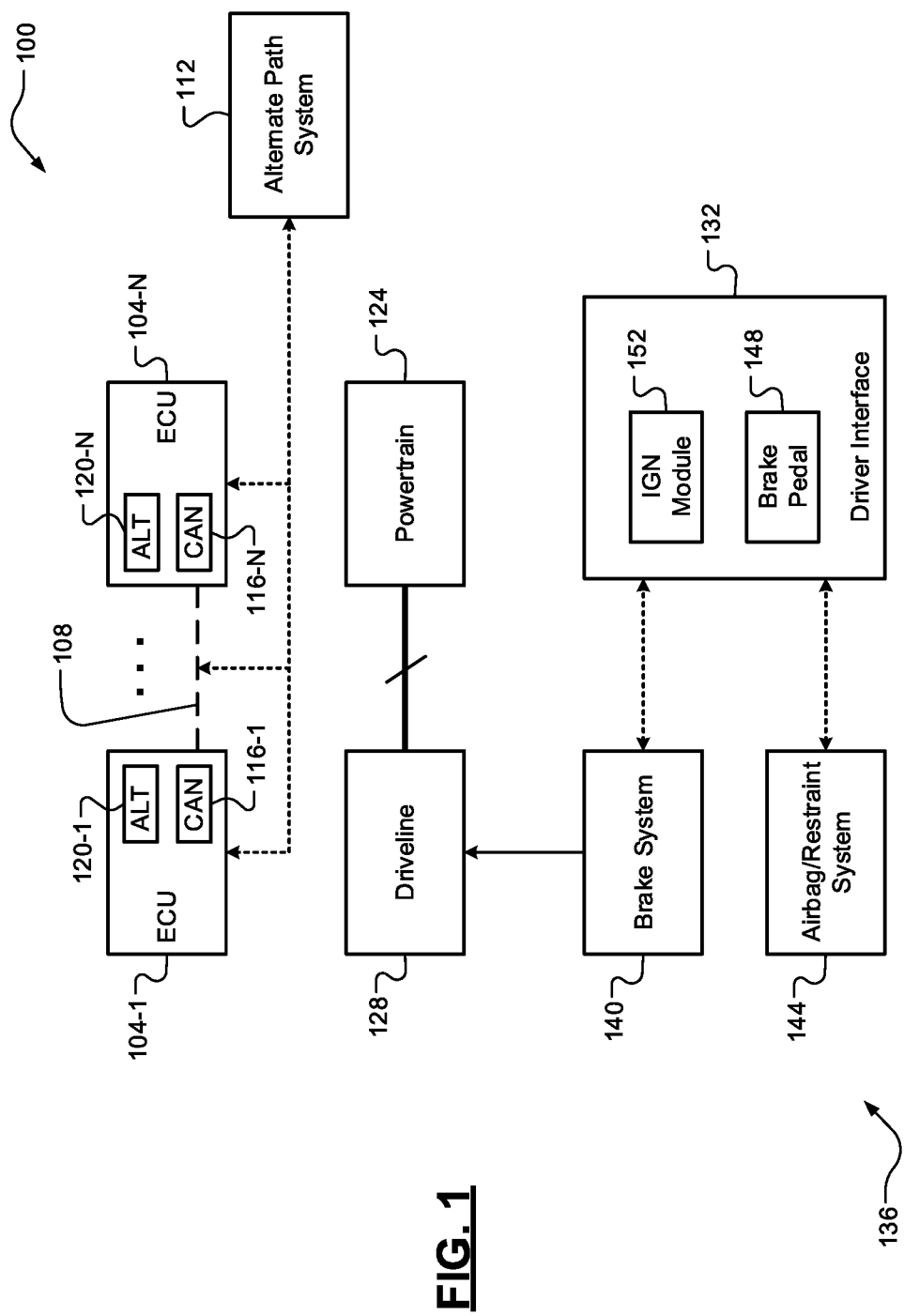
FIG. 1 is a functional block diagram of a vehicle having a plurality of electronic control units (ECUs) on a controller area network (CAN) and an example alternate communication path for safety critical signals according to the principles of the present application.

Referring now to FIG. 1, a functional block diagram of a vehicle 100 having a plurality of electronic control units (ECUs) 104-1 . . . 104-N (N being an integer greater than one; collectively "ECUs 104") on a controller area network (CAN) 108 and an example alternate communication path for safety critical signals according to the principles of the present application is illustrated. An alternate path determination and communication system 112 is shown and is configured to control communication via respective components of the ECUs 104 as will now be described in greater detail. While the system 112 is shown as being separate from the ECUs 104, it will be appreciated that the system 112 could be at least partially implemented within the ECUs 104 (e.g., in software executing therein).

The system 112 is configured to control communication via the CAN network or bus 108 via CAN transceivers ("CAN") 116-1 . . . 116-N (collectively, "CAN transceivers 116") and via alternate communication path(s) (LIN, Ethernet, etc.) via non-CAN transceivers 120-1 . . . 120-N (collectively, "ALT transceivers 120"). The vehicle 100 generally comprises a powertrain 124 configured to generate and transfer drive torque (e.g., via an automatic transmission, not shown) to a driveline 128 for vehicle propulsion. Non-limiting examples of the components of the powertrain 124 include an electric motor powered by a high voltage battery system, an internal combustion engine running on a fuel/air mixture, and any combinations thereof.

In most scenarios, the vehicle 100 is a motorized/moving passenger vehicle that has one or more human passengers riding inside and under the control of a driver/operator via a driver interface 132. For this reason, the vehicle 100 typically includes a set of safety systems 136. Two illustrated example safety systems of the set of safety systems 136 are a brake system 140 and an airbag/restraint system 144. The brake system 140 is configured to provide braking force at the driveline 128 to slow/stop the vehicle 100 from moving, and the brake system 140 could be controlled by the driver/operator (via a brake pedal 148) and/or automatically controlled. One common example embodiment of the brake system 140 is an anti-lock braking system (ABS).

The airbag/restraint system 144 is configured to selectively deploy one or more airbags or similar impact-mitigation devices to prevent direct contact between human passengers of the vehicle 100 and hard interior surfaces of the vehicle 100 to mitigate or prevent physical harm to the passenger(s) during collisions/crashes of the vehicle 100. It will be appreciated that these are merely two common examples of the safety system(s) 136 and that the vehicle 100 could include other suitable systems.

Certain signals that are monitored and shared amongst the ECUs 104 could be deemed "safety critical signals," meaning that they are related or associated with aspects of controlling the safety system(s) 136. One good example of a safety critical signal is an ignition status of an ignition module 152 of the vehicle 100. This ignition module 152 could be, for example, a power/ignition on/off switch of the vehicle 100. The ignition status could be a safety critical signal as it could be a requirement or precondition for activation or control of the safety system(s) 136 of the vehicle 100. For example, when the vehicle 100 is powered down or off, the brake system 140 should not be actuated and the airbag/restraint system 144 should not deploy airbag(s) within the vehicle 100. During a CAN malfunction, an ignition status could be "lost" during operation or change in the ignition status (e.g., from off to on) may never be received from a secondary ECU 104 overseeing the safety system(s) 136 from a primary or supervisory ECU 104 overseeing the ignition module 152 and the secondary ECU 104. Thus, this could result in the safety system(s) 136 not being properly actuated/engaged at all necessary times, regardless of whether the primary/supervisory ECU 104 has error detection and recovery (checksums, CSMA/CD, firewall protection, etc.).

Figure 2:
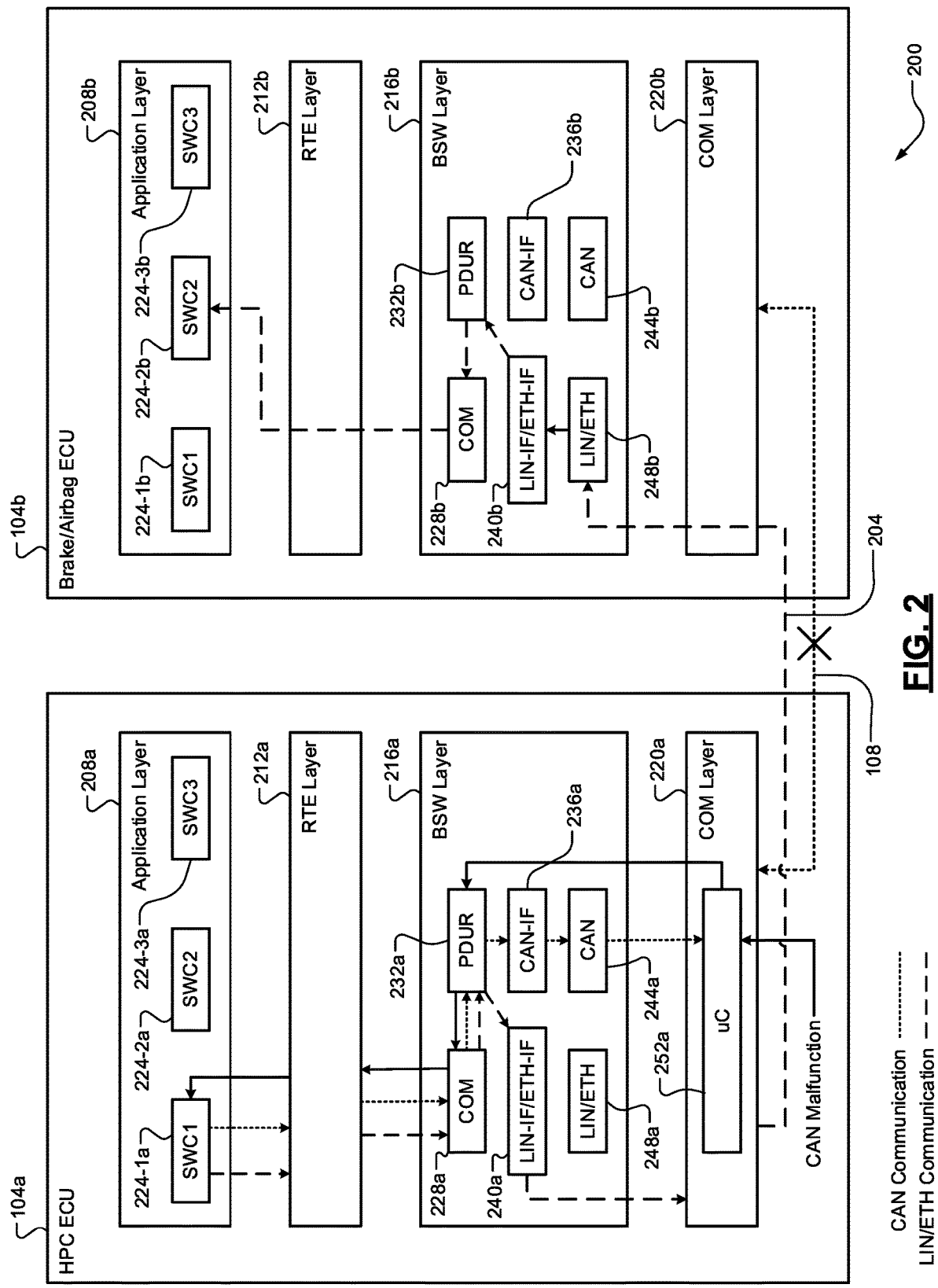
FIG. 2 is a functional block diagram of an example primary ECU and a secondary ECU connected via a CAN and an alternate communication path for robust transmission/sharing of safety critical signals according to the principles of the present application.

Referring now to FIG. 2 and with continued reference to FIG. 1, a functional block diagram of an example primary ECU 104*a* and a secondary ECU 104*b* connected via the CAN 108 and a non-CAN alternate communication path 204 (LIN, Ethernet, etc.) for robust transmission/sharing of safety critical signals according to the principles of the present application is illustrated. While not specifically illustrated, it will be appreciated that communication between the ECUs 104*a*, 104*b* via the CAN 108 could be performed or handled by the respective CAN transceivers 116 and communication between the ECUs 104*a*, 104*b* via the non-CAN alternate communication path 204 could be performed or handled by the respective alternate non-CAN transceivers or communication modules 120.

As previously mentioned, a supervisory or primary controller often monitors signals, some of which are safety critical, which are then used by its overseen or sub-ECU(s) that specifically each are responsible for controlling one or more of the safety system(s) the 136 of the vehicle 100. In the illustrated example, the left/primary controller is a hybrid processor controller (HPC) ECU 104*a* and the right/secondary controller is a brake/airbag ECU 104*b*. It will be appreciated that these are merely examples for illustrative purposes and the techniques of the present application are applicable to any vehicles having a plurality of ECUs sharing safety critical signals.

As shown, each of the ECUs 104*a*, 104*b* is generally divided into a stack of different layers: application or SWC layers 208*a*, 208*b*, RTE layers 212*a*, 212*b*, basic software (BSW) layers 216*a*, 216*b*, and COM layers 220*a*, 220*b*. Application layer 208*a* is further divided into a plurality of SWCs 224-1*a* . . . 224-3*a* and application layer 208*b* is similarly further divided into a plurality of SWCs 224-1*b* . . . 224-3*b*. While three SWCs are shown in each respectively application layer 208*a*, 208*b*, it will be appreciated that each application layer 208*a*, 208*b* could include any suitable number of SWCs. BSW layer 216*a* is further divided into a COM module 228*a*, a PDUR 232*a*, a CAN interface (CAN-IF) module 236*a*, a LIN interface or Ethernet interface (LIN-IF/ETH-IF) module 240*a*, and finally, a CAN driver 244*a* and a LIN or Ethernet driver 248*a*.

In the HPC ECU 204*a*, the COM layer 220*a* further comprises a microcontroller (uC) 252*a* for handling which signals are sent via which communication mediums/channels. BSW layer 216*b* is similarly further divided into a COM module 228*b*, a PDUR 232*b*, a CAN-IF module 236*b*, a LIN-IF/ETH-IF module 240*b*, a CAN driver 244*b*, and a LIN/ETH driver 248. While not specifically illustrated for simplicity, the COM layer 220*b* could include its own uC like COM layer 220*a*, for handling of safety critical signal(s) being sent directly via the non-CAN communication path (e.g., a LIN or Ethernet bus) to the receiving LIN/ETH driver 248*b* and LIN-IF/ETH-IF 240*b*, and eventually, for example, to respective SWC 224-2*b* for a relevant safety routine.

Figure 3A:
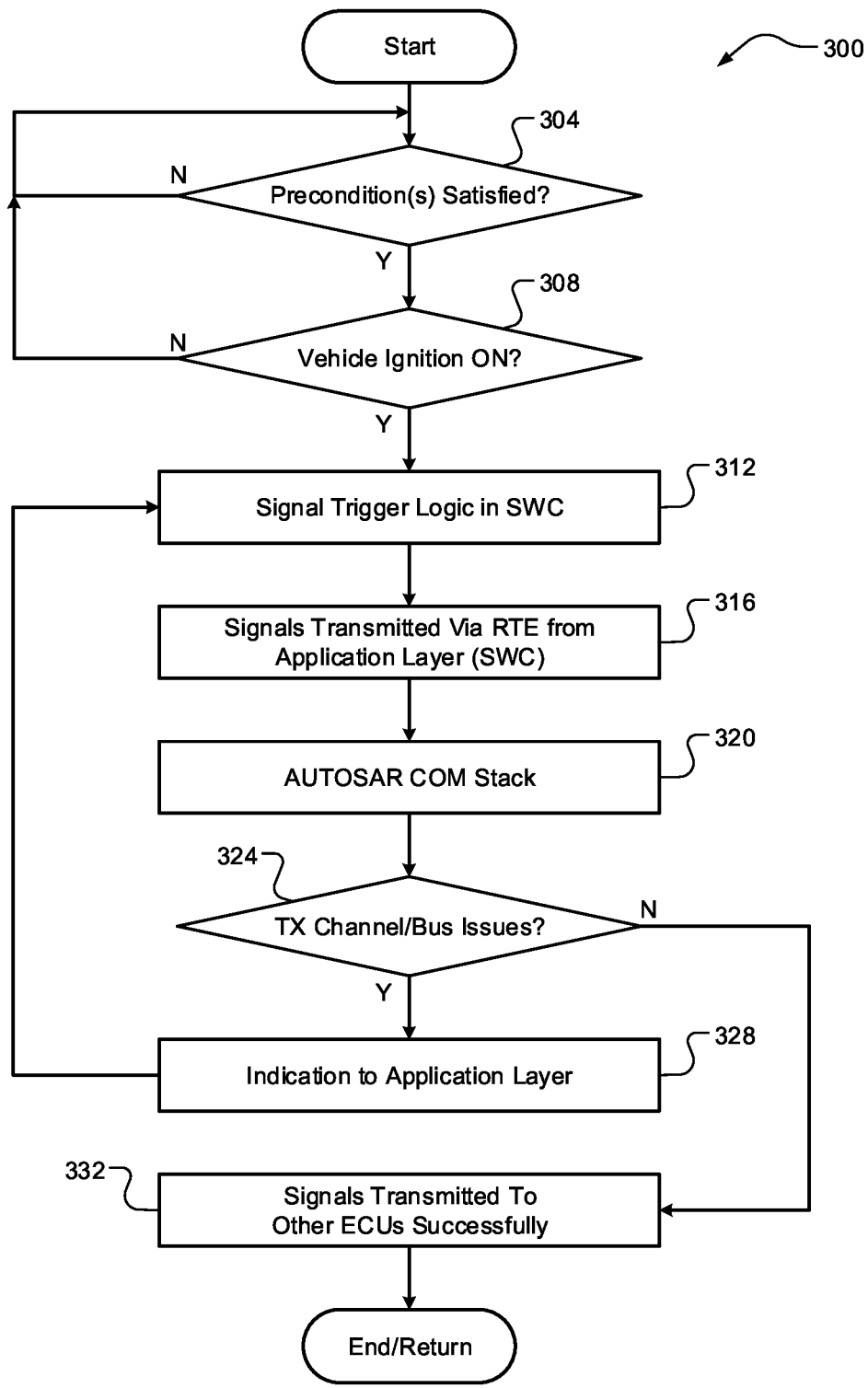
FIGS. 3A-3B are flow diagrams of an example alternate communication path determination and control method for safety critical signals for a vehicle having a plurality of ECUs on a CAN according to the principles of the present application.
Figure 3B:
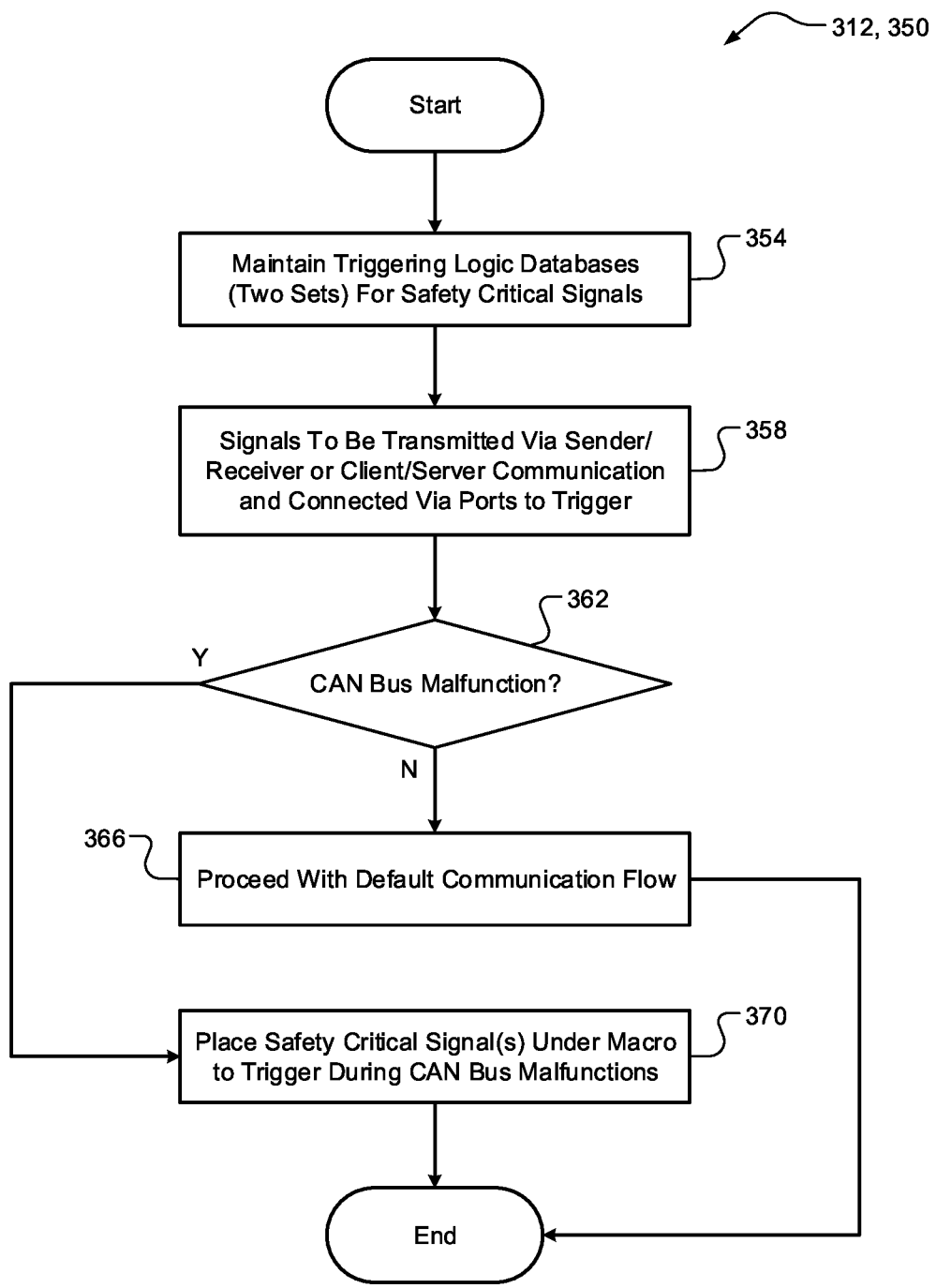

Referring now to FIGS. 3A-3B, flow diagrams of an example alternate path determination and communication method 300 for safety critical signals for a vehicle having a plurality of ECUs on a CAN according to the principles of the present application is illustrated. While the vehicle 100 and its components are specifically referenced for illustrative/descriptive purposes, it will be appreciated that this method 300 could be applicable to any suitable vehicle having multiple ECUs and the requisite communication protocols. In addition, while AUTOSAR protocol specifics are described, it will be appreciated that these techniques are applicable or extendable to legacy/non-AUTOSAR networks.

At optional 304, a set of one or more preconditions could be checked for satisfaction before proceeding with the method 300. This could include, for example only, there being no other malfunctions (e.g., other than the possible CAN malfunction) that could otherwise interfere with the method 300. When false, the method 300 ends or returns to 304. Otherwise, the method 300 proceeds to 308. At 308, it is determined whether the vehicle 100 is powered on and operational. It will be appreciated that steps 304-308 could be combined into a single, more complex decision. When false, the method 300 ends or returns to 304 or 308. Otherwise, the method 300 continues to 312.

At 312, the SWC (e.g., SWC 224-1*a* in FIG. 2) executes signal triggering logic. As previously discussed, this could include maintaining one or more databases defining safety critical signals that require transmission via an alternate redundant path when there is a CAN malfunction. FIG. 3B illustrates an example sub-routine or method 350 that collectively corresponds to this step 312. At 354, triggering logic databases (e.g., two sets of the same databases) are maintained for safety critical signals. These two triggering logic databases could be maintained, for example, in respective memories of the ECUs (e.g., HPC ECU 104*a* and brake/airbag ECU 104*b* of FIG. 2). At 358, the signals to be transmitted (a set of signals) are assigned respective communication mediums/paths and ports.

When safety critical signal(s) are identified, for example, the safety critical signal(s) could be assigned to utilize the alternate communication path 204 (e.g., the LIN or Ethernet bus) depending on whether a malfunction of the CAN bus 108 (physical disconnection, excessive interference, etc.) occurs. At 362, the determination or detection of the CAN bus malfunction is performed. When no CAN bus malfunction is detected, the method 350 proceeds to 366 where default communication flow occurs (e.g., via the CAN bus 108) and the method 350 ends (returns to step 316 of FIG. 3A). When the CAN bus malfunction is detected, however, the method 350 proceeds to 370 where the safety critical signal(s) are placed under a macro (e.g., an automated routine) to trigger alternate communication thereof during the CAN bus malfunction and the method 350 ends (returns to step 316 of FIG. 3A).

Referring again to FIG. 3A, after 312 the method 300 proceeds to 316. At 316, the signals are transmitted from the application layer or its SWC (e.g., SWC 224-1*a* of application layer 208*a*) via RTE (e.g., RTE layer 212*a*). At 320, the AUTOSAR COM stack (e.g., COM module 228*a*) receives the signals and at 324 the method 300 determines whether there are any issues (e.g., malfunctions) of the designated transmission (TX) channel or bus. When false, the method 300 proceeds to 332 where the signals are transmitted to the other ECUs (e.g., brake/airbag ECU 104*b*) successfully and the method 300 ends. When true, however, the method 300 proceeds to 328 where an indication is provided back to the application layer (e.g., application layer 208*a*) and the method 300 returns to 312 where the signal triggering logic is repeated or performed again. For example, if safety critical signals were not properly assigned to the non-CAN communication path or bus 204 and there is a CAN bus malfunction, the safety critical signal(s) need to be properly assigned (macro triggered) for transmission via the non-CAN communication path or bus 204, thereby increasing robustness and improving reliability that the safety critical signals are properly received.

It will be appreciated that the terms "controller" and "electronic control unit" or "ECU" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An alternate path determination and communication system for a vehicle having a plurality of electronic control units (ECUs) on a controller area network (CAN), the system comprising:
    a first non-CAN communication transceiver of a first ECU of the plurality of ECUs, the first ECU being a supervisory controller configured to monitor a set signals for the vehicle;
    a second non-CAN communication transceiver of a second ECU of the plurality of ECUs, the second ECU being configured to control a set of safety systems of the vehicle; and
    a control system comprising (i) a non-transitory memory configured to store a triggering logic database specifying a set of safety critical signals and (ii) one or more processors configured to maintain the triggering logic database and to:
        trigger alternate communication from the first ECU to the second ECU of any of the set of signals matching the set of safety critical signals in response to a communication malfunction of the CAN therebetween, and
        control transmission of any safety critical signals from the first non-CAN communication transceiver of the first ECU to the second non-CAN communication transceiver of the second ECU,
        wherein receipt of one or more safety critical signals by the second non-CAN communication transceiver of the second ECU causes the second ECU to control the set of safety systems accordingly.

2. The system of claim 1, wherein the control system is configured to control transmission of the set of signals from the first ECU to the second ECU via the CAN when there is no communication malfunction of the CAN therebetween.

3. The system of claim 1, wherein the set of safety systems comprises at least one of a braking system of the vehicle and an airbag/restraint system of the vehicle.

4. The system of claim 1, wherein the first and second non-CAN communication transceivers are in communication via a local interconnect network (LIN) bus.

5. The system of claim 4, wherein the set of signals and the set of safety critical signals both include an ignition status of the vehicle that is provided by an ignition module connected to both the CAN and the LIN bus.

6. The system of claim 1, wherein the first and second non-CAN communication transceivers are in communication via an Ethernet bus.

7. The system of claim 1, wherein the first and second ECUs are not configured to perform an error and recovery method for the CAN.

8. The system of claim 7, wherein the error detecting and recovery method includes at least one of checksums, Carrier Sense Multiple Access/Collision Detection (CSMA/CD), and firewall protection.

9. The system of claim 1, wherein the first and second ECUs are not connected via redundant hardwire communication lines.

10. An alternate path determination and communication method for a vehicle having a plurality of electronic control units (ECUs) on a controller area network (CAN), the method comprising:
    providing a first non-CAN communication transceiver of a first ECU of the plurality of ECUs, the first ECU being a supervisory controller configured to monitor a set signals for the vehicle;
    providing a second non-CAN communication transceiver of a second ECU of the plurality of ECUs, the second ECU being configured to control a set of safety systems of the vehicle;
    maintaining, at a non-transitory memory of a control system and by one or more processors of the control system, a triggering logic database specifying a set of safety critical signals;
    triggering, by the control system, alternate communication from the first ECU to the second ECU of any of the set of signals matching the set of safety critical signals in response to a communication malfunction of the CAN therebetween; and
    controlling, by the control system transmission of any safety critical signals from the first non-CAN communication transceiver of the first ECU to the second non-CAN communication transceiver of the second ECU,
    wherein receipt of one or more safety critical signals by the second non-CAN communication transceiver of the second ECU causes the second ECU to control the set of safety systems accordingly.

11. The method of claim 10, further comprising controlling, by the control system, transmission of the set of signals from the first ECU to the second ECU via the CAN when there is no communication malfunction of the CAN therebetween.

12. The method of claim 10, wherein the set of safety systems comprises at least one of a braking system of the vehicle and an airbag/restraint system of the vehicle.

13. The method of claim 10, wherein the first and second non-CAN communication transceivers are in communication via a local interconnect network (LIN) bus.

14. The method of claim 13, wherein the set of signals and the set of safety critical signals both include an ignition status of the vehicle that is provided by an ignition module connected to both the CAN and the LIN bus.

15. The method of claim 10, wherein the first and second non-CAN communication transceivers are in communication via an Ethernet bus.

16. The method of claim 10, wherein the first and second ECUs are not configured to perform an error and recovery method for the CAN.

17. The method of claim 16, wherein the error detecting and recovery method includes at least one of checksums, Carrier Sense Multiple Access/Collision Detection (CSMA/CD), and firewall protection.

18. The method of claim 10, wherein the first and second ECUs are not connected via redundant hardwire communication lines.

* * * * *